(12) United States Patent
Baker

(10) Patent No.: US 7,568,288 B2
(45) Date of Patent: Aug. 4, 2009

(54) POWER HAND TOOL RIGHT ANGLE ATTACHMENT HAVING A LIGHT SOURCE WITH A SELF-GENERATING POWER SUPPLY

(75) Inventor: Timothy Baker, Roselle, IL (US)

(73) Assignee: Credo Technology Corporation, Broadview, IL (US)

( * ) Notice: Subject to any disclaimer, the term of this patent is extended or adjusted under 35 U.S.C. 154(b) by 1306 days.

(21) Appl. No.: 10/648,048

(22) Filed: Aug. 26, 2003

(65) Prior Publication Data

US 2005/0044728 A1 Mar. 3, 2005

(51) Int. Cl.
*H02K 21/00* (2006.01)
(52) U.S. Cl. .......................... 30/388; 362/119
(58) Field of Classification Search ............ 30/122, 30/390, 388; 362/192, 193, 119, 120
See application file for complete search history.

(56) References Cited

U.S. PATENT DOCUMENTS

| | | | | |
|---|---|---|---|---|
| 2,607,092 A | * | 8/1952 | Rubly | 24/274 R |
| 2,900,856 A | * | 8/1959 | Maier | 81/54 |
| 4,334,522 A | * | 6/1982 | Dukess | 126/572 |
| 4,751,970 A | | 6/1988 | Hecker et al. | |
| 5,525,842 A | | 6/1996 | Leininger | |
| 5,765,272 A | * | 6/1998 | Borcicky | 29/222 |
| 5,793,130 A | | 8/1998 | Anderson | |
| 5,863,159 A | | 1/1999 | Lasko | |
| 5,982,059 A | * | 11/1999 | Anderson | 310/50 |
| 6,048,260 A | * | 4/2000 | Kopras | 451/358 |
| 6,352,127 B1 | | 3/2002 | Yorde | |
| 6,443,675 B1 | * | 9/2002 | Kopras et al. | 409/182 |
| 6,481,130 B1 | * | 11/2002 | Wu | 40/546 |
| 6,713,905 B2 | * | 3/2004 | Hirschburger et al. | 310/47 |
| 2002/0131267 A1 | | 9/2002 | Van Osenbruggen | |
| 2005/0009458 A1 | * | 1/2005 | Uzumcu et al. | 451/359 |

FOREIGN PATENT DOCUMENTS

DE 202 15 382 4/2003

OTHER PUBLICATIONS

Dremel, DREMELITE™, May 2002.

\* cited by examiner

*Primary Examiner*—Stephen Choi
(74) *Attorney, Agent, or Firm*—Greers, Burns & Crain, Ltd.

(57) ABSTRACT

A preferred embodiment of the preferred invention comprises a right angle attachment for a power hand tool of the type which has a generally cylindrical elongated housing with a motor contained within the housing or case and the motor having an output shaft that extends from the nose end of the hand tool. The attachment has a housing with a mounting end that fits on the nose end portion of the tool housing, with the housing having an input shaft and an output shaft that are operably coupled together by bevel gears attached to each shaft. A magnet is mounted on the output shaft near an electric circuit located within the housing for producing current that drives the LED's. Since the magnet and the circuit are inside the housing, a lens is provided in the housing adjacent the light producing device for emitting light to the exterior of the housing and toward the tool attached to the distal end.

3 Claims, 3 Drawing Sheets

POWER HAND TOOL RIGHT ANGLE ATTACHMENT HAVING A LIGHT SOURCE WITH A SELF-GENERATING POWER SUPPLY

BACKGROUND OF THE INVENTION

The present invention generally relates to power hand tools and more particularly to a right angle attachment for the same.

Small rotary hand tools that have a generally cylindrical housing or case have been marketed for many years for use in carrying out various woodworking and metal working tasks by hobbyists as well as commercial artisans. Such rotary hand tools generally have a motor unit with a rotary output shaft extending from the nose end and often have a case nose portion that is configured to connect to various accessories or attachments. Some of these rotary hand tools are somewhat larger and more powerful and are known in the building trade as spiral saws that use a side cutting bit to penetrate and to rapidly cut holes for electrical outlets, light fixtures and switches and the like in dry wall. Because these tools are quite powerful even though they are relatively small, they are convenient to use on a jobsite or just about anywhere else where a source of AC power is available.

It is also desirable for some applications that the orientation of a grinding or sawing tool be changed to a right angle relationship relative to the hand tool output shaft. For such usage, a right angle attachment may be convenient for a sawing operation or for working in hard to get at areas. In certain situations, a right angle relationship may provide greater maneuverability that enables the hand tool to be handled and controlled more easily.

Because such power hand tools can be used to perform many tasks, some of which may be in locations where the ambient light is not particularly good, a recent development has involved placement of lights at the nose end of the hand tool which are illuminated by means of an onboard generating system typically in the form of a magnet being located on the output shaft that creates a magnetic field that is induced into an inductive coil or inductor which generates a current that is used to illuminate a light producing device. While many types of light producing devices can be used, the solid-state light emitting diodes (LEDs) are preferred because they are not prone to being easily damaged and do emit sufficient amounts of light to illuminate the work area without consuming any appreciable amount of power. It should be apparent that if the light emitting diodes are in the nose portion of the hand tool, mounting an external attachment to the nose portion of the tool likely covers the light being produced. Also, the attachment extends the structure by a distance that may make the light produced ineffective to illuminate the work area when a tool or blade is installed on the output shaft of the accessory attachment.

SUMMARY OF THE INVENTION

A preferred embodiment of the preferred invention comprises a right angle attachment for a power hand tool of the type which has a generally cylindrical elongated housing with a motor contained within the housing or case and the motor having an output shaft that extends from the nose end of the hand tool. The attachment has a housing with a mounting end that fits on the nose end portion of the tool housing, with the housing having an input shaft and an output shaft that are operably coupled together by bevel gears attached to each shaft. A magnet is mounted on the output shaft near an electric circuit located within the housing for producing current that drives the LED's. Since the magnet and the circuit are inside the housing, a lens is provided in the housing adjacent the light producing device for emitting light to the exterior of the housing and toward the tool attached to the distal end

DETAILED DESCRIPTION OF THE PREFERRED EMBODIMENT

Figure 1A:
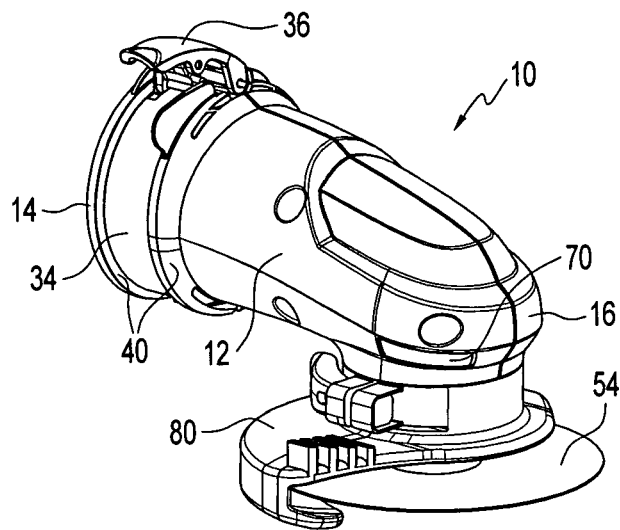
FIG. 1A is a perspective side view of the preferred embodiment of the right angle attachment
Figure 1B:
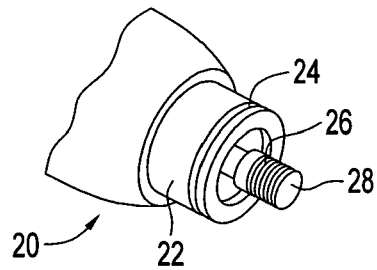
FIG. 1B is the nose portion of a power hand tool to which the right angle attachment of FIG. 1A can be attached.
Figure 2:
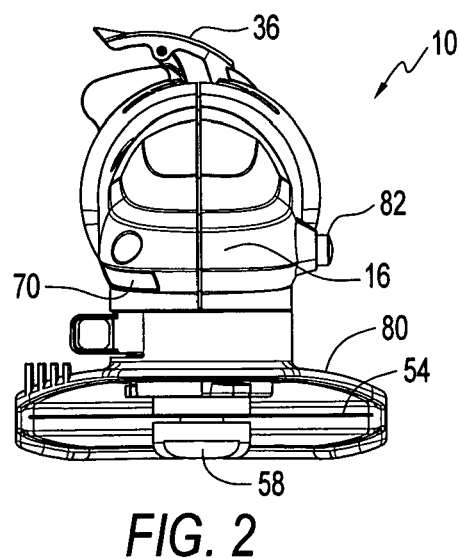
FIG. 2 is a front plan view of the apparatus of FIG. 1A.
Figure 3:
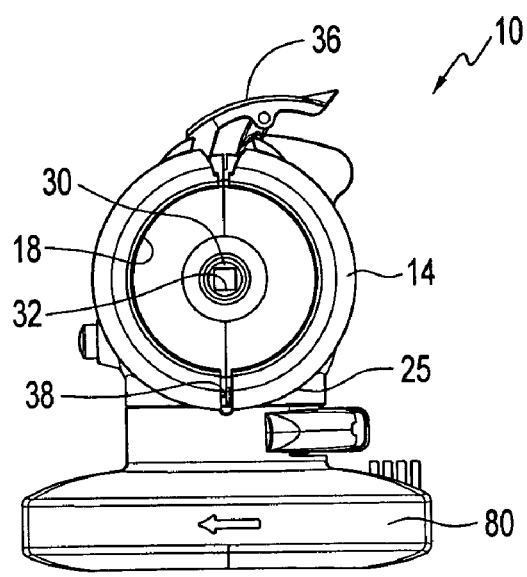
FIG. 3 is a rear plan view of the apparatus of FIG. 1A.

The preferred embodiment of the right angle attachment of the present invention is illustrated in FIGS. 1A, and 2-7. The structure of the attachment, indicated generally at 10, is best shown in FIGS. 1A, 2 and 3 and includes a housing 12 that has a mounting end 14 and a distal end 16, with the mounting end 14 having a cylindrically shaped inside surface 18 that is configured to snugly fit on a rotary power hand tool, indicated generally at 20. More particularly, the mounting end 14 fits on a cylindrical nose portion 22 of the tool 20 and has an annular groove 24 near the outer end thereof. The hand tool 20 has a motor (not shown) which has an output shaft 26 that preferably has a hollow interior 28 and an outside threaded surface. While not shown, a chuck or drive nut is threaded onto the output shaft 26 so that a tool can be secured to the shaft or the drive nut if an attachment such as the attachment 10 is mounted on the tool 20. The attachment 10 preferably has an input shaft 30 with a noncircular recess such as the square recess 32 that is configured to engage a drive shaft (not shown) that would fit into the square recess 32 as well as a similar square recess on a drive nut or the like. Rotation of the motor output shaft 28 will then drive the input shaft 30 when the attachment 10 is mounted to the hand tool 20.

To secure the attachment 10 to the nose portion 22, a clamping mechanism that comprises a band 34 that has a locking lever 36 attached to opposite end portions of the band. A gap 38 is formed in the mounting end 14, preferably by molding the gap during manufacture, with the gap 38 allowing limited radial movement so that the locking lever 36 and band 34 can bias the mounting portion 14 inwardly into firm contact with the cylindrical nose portion 22 of the hand tool. The length of the band 34 is such that the lever can be pressed downwardly in a locking position which will bias the mounting portion halves together and firmly hold the attachment 10 to the tool 20. A pair of annular flanges 40 are provided at the mounting end portion which are separated a distance that is greater than the width of the band 34 to retain the band 34 whether it is loose or in locked position.

Figure 4:
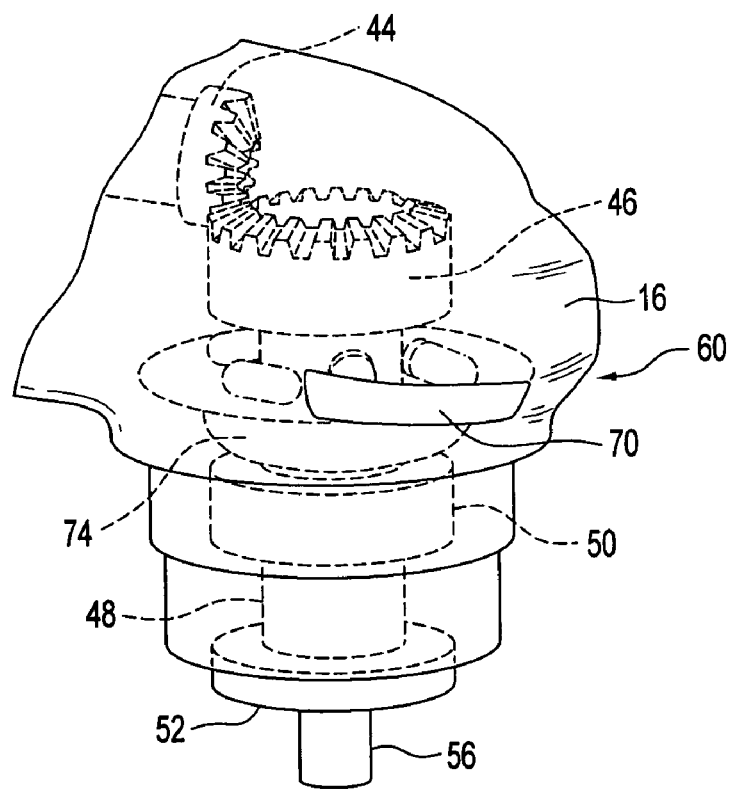
FIG. 4 is a partial cut away of a left front perspective, particularly illustrating the output shaft and light producing structure of the embodiment shown in FIG. 1A.

The input shaft 30 is journaled in bearings (not shown) and has a bevel gear 44, a portion of which is shown in FIG. 4 that engages a complementary bevel gear 46 that is attached to an output shaft 48 that is journaled in upper and lower bearings 50, only the lower one of which is shown in FIG. 4. The outer portion of the bearing is secured by an internal rib structure that is formed with the end portion 16. The bottom portion of the shaft 48 has an enlarged annular flange 52 that provides a support surface for a saw blade 54 (see FIGS. 1A and 2) and a smaller diameter end portion 56 which has internal threads for receiving an enlarged end cap 58 that has a small diameter threaded central portion that engages the internal threads of the end portion 56.

Figure 5:
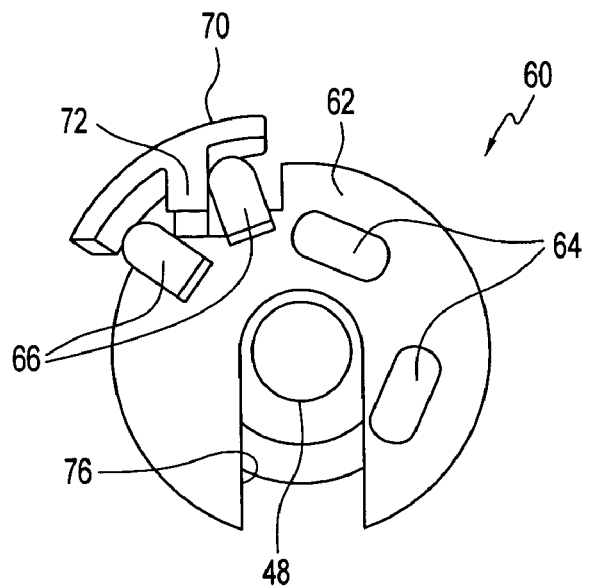
FIG. 5 is a top view of the light producing structure shown in FIG. 4.
Figure 6:
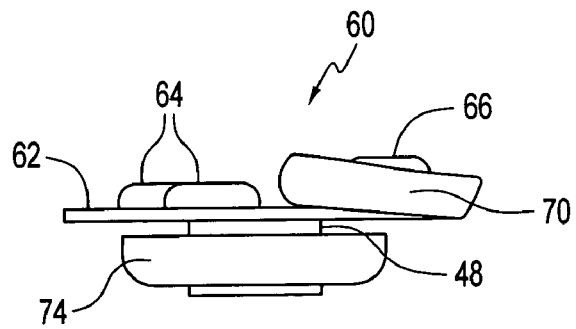
FIG. 6 is a side plan view of the light producing structure of FIG. 4.
Figure 7:
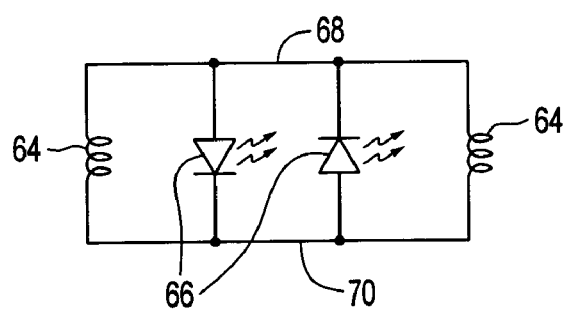
FIG. 7 is an electrical schematic diagram of the circuitry of the light producing structure.

Referring to FIGS. 4-6, a light producing structure, indicated generally at 60, is shown to be located within the housing 12 between the bushing 50 and the pinion gear 46. The light producing structure comprises a printed circuit board 62 on which a pair of inductors 64 are mounted together with a pair of LED's 66. The inductors and LED's are interconnected by conductive lines that are formed on the printed circuit board 62 to produce the electrical circuit diagram shown in FIG. 7. The four components are connected in parallel by lines 68 and 70 and significantly the diode 66 are inverted relative to each other, i.e., the cathode of each is connected to the anode of the other and vice versa. As is shown in FIG. 5, the LED's are located in close proximity to a lens 70 that is also illustrated in FIGS. 1A, 2, 4 and 6 which has a pair of deflectable prongs 72 which enable the lens to be snap fit into the housing 12. While two inductors and two LED's are shown, only one of either of them may produce a sufficient amount of light.

The configuration of the LED's relative to the printed circuit board 62 is such that the lens 70 is located at the distal end 16 of the housing and is at the left side thereof as shown in FIGS. 1A and 2 and is slightly angularly positioned to direct light downwardly toward the blade 54. The lens 70 is preferably molded from a transparent plastic material. A magnet 74, which preferably has eight poles, but can have a fewer number of poles is in the form of a ring and is located immediately adjacent the printed circuit board 62 and is attached to the shaft 48. The magnet preferably has a flat upper surface where the magnetic poles are located so they are in close proximity to the inductors 66. The magnet 74 is also preferably sized so that it can be press fit onto the shaft 48 and be held firmly in place.

It should be understood that the light producing mechanism 60 can be separately fabricated, since the entire circuit and its components are mounted to the printed circuit board which has a circular outer periphery but which also includes a cut out portion 76 that has a semi-circular portion in the center that enables it to fit around the shaft 48 and a width that is also slightly larger than the shaft 48 which enables the printed circuit board to be slipped onto the shaft 48 and into cooperative slots in the housing to hold it in its proper position.

While not a part of the present invention, the attachment 10 may include a saw guard 80 which can be removed from the attachment when the blade 54 is removed. A locking button 82 is also provided on the left side which can be depressed to engage slots in the bevel gear 46 (not shown) for the purpose of holding the output shaft 48 in place so that the end cap 58 can be tightened and loosened.

In the present application, a "right" angle is intended to have a broader meaning than precisely 90°, and refers to orientations having the general appearance of a 90° angle.

When the magnet 74 rotates in close proximity to the inductive coils or inductors 64, current is induced in them as the flux lines pass alternately through them. As the magnet poles pass by the inductors 64, they generate a positive or negative current in the inductor, depending on the pole which is in proximity to the particular inductor 64 in a generally sinusoidal waveform. The two LEDs 64 are connected so that their polarities are opposite, and since each LED 64 allows current to flow in only one direction, they alternately switch on and off. As long as the frequency of the switching is greater than that which the human eye can detect, each LED 64 will appear to be on constantly when the tool 10 is being operated. This frequency is controlled by the number of magnetic pole pairs and the frequency at which they pass by the inductors 64. Accordingly, the rotational speed of the tool 10, and the number of poles on the magnetic ring 74 controls the frequency. In the preferred configuration, the positioning of the inductors 64 at approximately 90 degrees relative to each other causes the current induced in each inductor 64 to complement the other and therefore generate a higher current than would be generated with a single inductor. As is known to those skilled in the art, the greater the number of poles, the shorter the flux lines are that emanate from the magnet 74. The use of eight poles for the magnet 74 therefore requires that the magnet be close to the inductors 64 as shown in FIG. 6.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A right angle attachment for a power hand tool of the type which has an elongated generally cylindrical housing containing a motor having a motor output shaft extending from a nose end thereof, the housing having a generally cylindrical nose end portion that is concentric with said motor output shaft, said nose end portion providing a structure on which said attachment can be mounted, said attachment comprising:

a housing having a mounting end and a distal end, with the mounting end having a cylindrical opening sized to snugly fit on the nose end portion of the tool housing;

said housing having an input shaft journaled in bushings and having an engaging recess at one end portion for engaging a drive shaft that is driven by the motor output shaft, and an attached gear at the opposite end;

said housing having an output shaft journaled in bushings, said output shaft being configured to rotate a tool attached to said distal end, and having a gear attached to its opposite end portion;

said input shaft gear engaging said output shaft gear at a generally 90 degree angle so that said motor output shaft drives said accessory output shaft;

a magnet mounted on said output shaft and an electrical circuit mounted in said attachment housing adjacent said magnet for producing power, said circuit comprising at least one light producing device, and a printed circuit board having conductive lines and being in sufficiently close proximity to said magnet so that rotation of said magnet causes the magnetic field of the magnet to induce a current in inductors for driving said light producing device, said circuit further comprising two inductors and two LEDs connected in parallel with one another, said two LEDs being connected such that the anode of one is connected to the cathode of the other, said inductors being located at approximately the same radius relative to the axis of said output shaft, but arcuately spaced from one another by approximately 90 degrees; and a lens in said housing adjacent said light producing device for admitting light to the exterior of said housing toward a tool attached to said distal end.

2. A right angle saw attachment for a power hand tool of the type which has an elongated generally cylindrical enclosure containing a motor having a motor output shaft extending from a nose end thereof, the enclosure having a generally cylindrical nose end portion that is concentric with said motor output shaft, said nose end portion providing a structure on which said attachment can be mounted, said attachment comprising:

a housing having a mounting end and a distal end, with the mounting end having a cylindrical opening sized to snugly fit on the nose end portion of the tool enclosure and the distal end has a generally cylindrical outer surface configured to receive a saw guard when a circular saw blade is attached to said attachment output shaft;

said housing having an input shaft journaled for rotation and having a recess at one end portion configured to engage a drive shaft that is operably driven by the motor output shaft, and a first bevel gear attached to the opposite end;

said housing having an output shaft journaled for rotation, said output shaft being configured to rotate a saw blade attached to an exposed end portion, and having a second bevel gear attached to its opposite end portion;

said first bevel gear engaging said second bevel gear at a generally 90 degree angle so that said motor output shaft effectively drives said accessory output shaft;

a magnet mounted on said attachment output shaft and configured to be rotated to produce an alternating magnetic field;

an electrical circuit mounted in said attachment housing adjacent said magnet. and comprising a printed circuit board having conductive lines and two inductive coils and two light producing diode devices, wherein said coils and devices are connected in parallel with one another, said two diode devices being connected such that the anode of one is connected to the cathode of the other, said inductive coils being located at approximately the same radius relative to the axis of said output shaft, but angularly spaced from one another by approximately 90 degrees, and being proximate said magnet in said circuit for generating an electric current from said magnetic fields, said printed circuit board being in sufficiently close proximity to said magnet that rotation of said magnet causes the magnetic field to induce a current in said inductive coil;

at least one device in said circuit for producing light when electric current is generated; and a lens in said distal end of said housing adjacent said light producing device for admitting light to the exterior of said housing toward said saw blade attached to said exposed end.

3. An attachment as defined in claim 2 wherein said magnet has at least two poles and is generally in the shape of a ring that fits around said accessory output shaft.

* * * * *